United States Patent [19]
Gadd et al.

[11] 3,901,568
[45] Aug. 26, 1975

[54] ROTARY MECHANISM BEARING ARRANGEMENT

[75] Inventors: Francis O. Gadd, Birmingham; Charles N. Hay, Sandusky, both of Ohio; William C. Long, Rochester, Mich.

[73] Assignee: General Motors Corporation, Detroit, Mich.

[22] Filed: Aug. 14, 1974

[21] Appl. No.: 497,334

[52] U.S. Cl. ............................................. 308/211
[51] Int. Cl.² ....................................... F16C 33/00
[58] Field of Search............. 308/187.1, 187.2, 210, 308/211, 180, 190, 191

[56] References Cited
UNITED STATES PATENTS

| | | | |
|---|---|---|---|
| 2,657,104 | 10/1953 | Kayser | 308/211 |
| 3,156,506 | 10/1964 | Scheifele et al. | 308/211 |
| 3,765,737 | 10/1963 | Hatch | 308/211 |

Primary Examiner—M. Henson Wood, Jr.
Assistant Examiner—Richard A. Bertsch
Attorney, Agent, or Firm—Arthur N. Krein

[57] ABSTRACT

A rotary mechanism bearing arrangement wherein an axially elongated machine element, such as a hub, is supported by inboard and outboard bearings on a spindle for rotation relative to each other, the outboard bearing being retained by means of a self-adjusting nut assembly including an enlarged internal wrenching nut threaded onto the spindle, the nut having cam ramps on the inboard end thereof cooperating with a cam ramp element encircling the spindle inboard of the nut to effect axial clearance take-up on the bearing, the nut being constituted as a body of revolution about an axis with an outer diameter of a size to retain both the inner and outer races of the outboard bearing within the hub and to serve as a secondary bearing to rotatably support the hub.

5 Claims, 3 Drawing Figures

PATENTED AUG 26 1975　　　　　　　　　　　3,901,568

ROTARY MECHANISM BEARING ARRANGEMENT

This invention relates to a rotary mechanism and, in particular, to a rotary mechanism bearing arrangement incorporating a self-adjusting bearing nut assembly for axial adjustment of the bearings supporting a hub for rotation relative to a spindle and which is also adapted to serve as a secondary bearing to rotatively support the hub relative to the spindle.

In conventional rotary mechanisms, such as in a hub and spindle assembly, it has been customary to axially retain the bearings rotatably supporting the hub on a non-rotative spindle by means of an external wrenching spindle nut, such as a castellated hex head nut with a washer sandwiched between this nut and the inner race of the outer or outboard bearing of such an assembly. In such a rotary mechanism, it has also been customary, in order to provide adequate room for the application of a wrench to the external wrenching nut, to make the hub of an axial length shorter than the axial length of the spindle to provide unlimited access to the spindle nut adjacent to the outboard end of the hub. In those cases where the axial length of the hub exceeds the axial length of the spindle, the outboard end of the hub has been provided with a substantially enlarged bore to permit ready access for a tool to engage the external wrenching nut.

In addition, in these prior art rotary mechanisms, proper adjustment of the bearings to eliminate axial play between, for example, a hub and the spindle on which it is mounted required a skilled workman to tighten the spindle nut to a predetermined torque for the particular rotary mechanism and then, if necessary, to back off the spindle nut until alignment with a cotter pin hole in the spindle is obtained to permit installation of a cotter pin to limit axial movement of the spindle nut in a spin-off direction.

It is therefore the principal object of this invention to improve a rotary mechanism bearing arrangement whereby the bearings rotatably supporting, for example, a hub on a spindle are adjusted by means of a self-adjusting bearing nut assembly with the spindle nut of this assembly serving as a bearing nut to provide a secondary bearing for the hub.

Another object of this invention is to provide a rotary mechanism bearing arrangement whereby retainment, for example, of the hub, spindle and bearing relationship of the normal elements of one such rotary mechanism is properly and automatically adjusted by means of a self-adjusting bearing nut assembly, the spindle nut of this assembly also being serviceable as a secondary bearing for the hub, the hub being of an axial length to overlie this secondary bearing.

These and other objects of the invention are attained by means of a rotary mechanism bearing arrangement in which, for example, a hub is rotatably supported by a pair of bearings on a spindle, axial end play of these elements being automatically adjusted by means of a self-adjusting bearing nut assembly, the spindle nut of this assembly, in the form of a bearing nut which is threaded onto and fixed to the spindle, being of a predetermined diameter relative to a mating inner diameter bored surface of the hub to act, if necessary, as a secondary support bearing for the hub.

For a better understanding of the invention, as well as other objects and further features thereof, reference is had to the following detailed description of the invention to be read in connection with the accompanying drawings, wherein.

Figure 1:
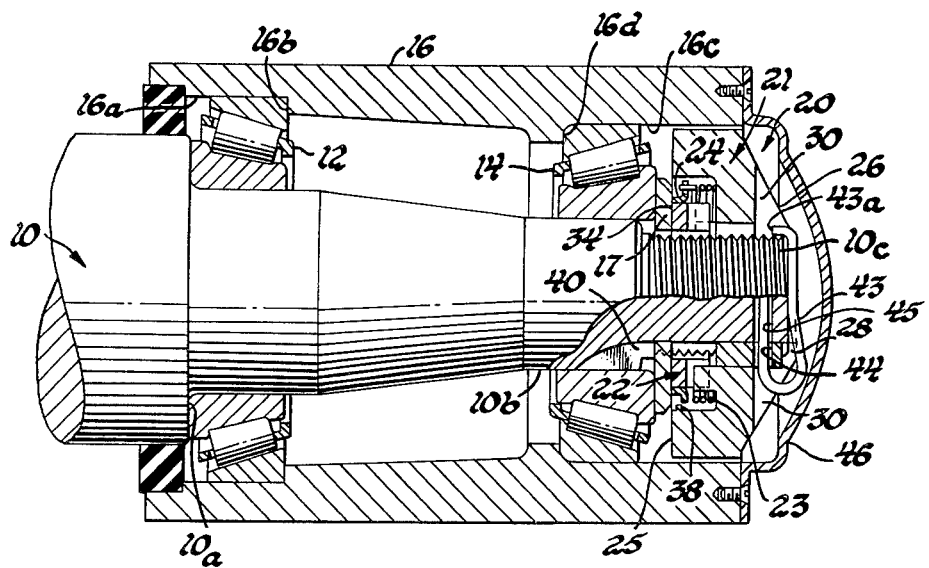
FIG. 1 is a sectional view of a portion of a rotary mechanism bearing arrangement, in accordance with the invention, wherein a self-adjusting bearing nut assembly used to retain and axially position the bearings supporting a machine element, such as a hub, on a spindle will also provide a secondary bearing for the hub.

Referring now to FIG. 1, there is shown, for the purpose of illustrating the principles of the invention, a rotary mechanism bearing arrangement which, in the embodiment disclosed, includes a non-rotative axle or spindle 10 rotatably supporting, by means of inboard and outboard bearings, such as roller bearings 12 and 14, respectively, a machine element, such as a hub 16.

The inner race of the inboard bearing 12 abuts against a shoulder 10a of the spindle while the outer race of this bearing is received in a stepped bore 16a on the inboard end of the hub to abut against the shoulder 16b of the hub. Outboard bearing 14 has its outer race received in an elongated bore 16c in the outboard end of the hub to abut against the shoulder 16d of the hub, while its inner race encircles the reduced diameter portion 10b of the spindle adjacent to its further reduced diameter, threaded free or outboard end portion 10c. By properly adjusting the axial position of the inner race of outboard bearing 14, the radial and axial play between the hub 16 and the spindle 10 can be eliminated. A bearing retaining washer 17 keyed to and slidable on the spindle 10 is axially positioned thereon by a self-adjusting bearing nut assembly, generally designated 20, to abut against the outboard end of the inner race of outboard bearing 14 to thereby effect this axial adjustment of the outboard bearing 14, inboard bearing 12, spindle 10 and hub 16 relative to each other.

Figure 2:
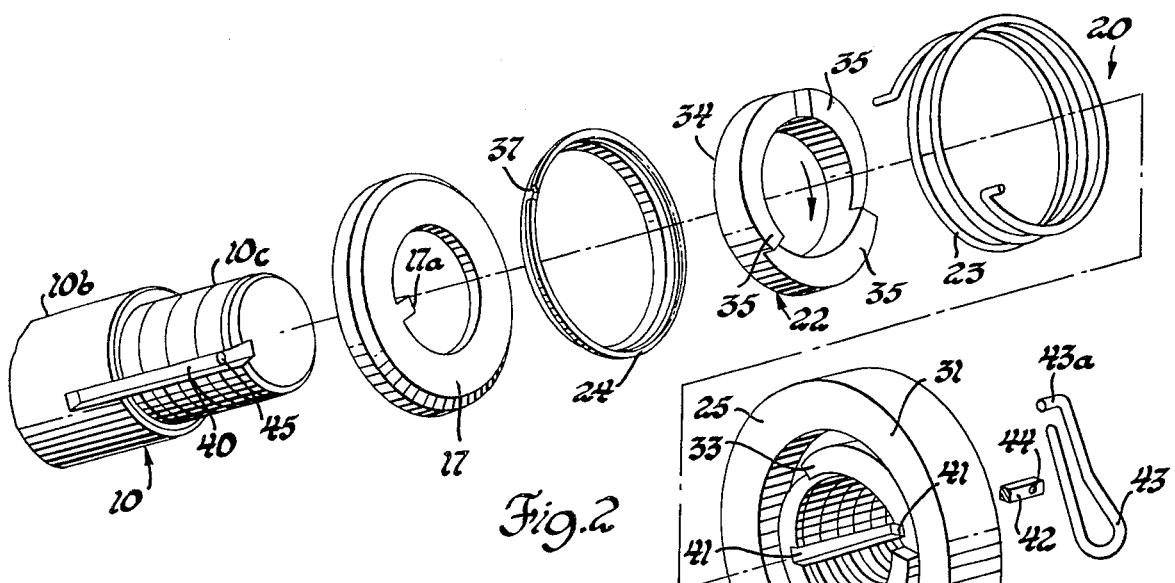
FIG. 2 is an exploded perspective view of the spindle and self-adjusting bearing nut assembly of FIG. 1, but with the spindle shown rotated 90° from its position in FIG. 1; and, FIG. 3 is an end view of the outboard end of the rotary mechanism bearing arrangement of FIG. 1, but with the cover removed.

As best seen in FIGS. 1 and 2, the self-adjusting bearing nut assembly 20 includes a spindle nut 21, a cam element 22 and a torsion spring 23 fixed at one end to the spindle nut 21 and at its other end to the cam element 22, as by engagement with an angled annular ring 24 suitably fixed to the cam element.

The spindle nut 21 is an internal wrenching nut having an outer cylindrical bearing surface adapted to rotatably support the hub in a manner and for a purpose to be described and, accordingly, may also be termed a bearing nut. The spindle nut 21, made of suitable material compatable as a bearing for the hub 16, is constituted as a body of revolution about an axis with a cylindrical portion 25 at one end, its inboard end as positioned on the spindle 10, and a frusto-conical portion 26 at its other end, or outboard end, with a stepped bore therethrough, threaded at 27 for engagement with the threaded portion 10c of the spindle and thus providing a flange 28 extending radially inward from the main body portion of the nut adjacent to its outboard end for engagement with the free end of spindle 10, for a purpose to be described.

Figure 3:
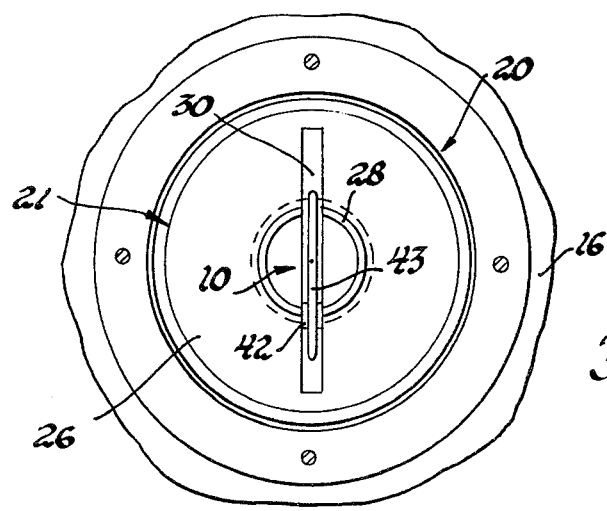

As best seen in FIGS. 1 and 3, the frusto-conical portion 26 is provided with radial extending through cutouts or slots to form sockets 30 at the outboard end of this nut body, the opposite sides of these slots being parallel to the axis of the spindle nut. This spindle nut is thus an internal wrenching nut with its sockets 30 adapted, if desired, to receive a complementary shaped wrench head, not shown, internally therein for driving the spindle nut onto the spindle. It is to be realized that the sockets 30 can be of any desired shape for such an internal wrenching nut, as is well known.

The cylindrical portion 25 of the spindle nut is provided with a planar surface 31 at its free or inboard end and with a collar 32 recessed from the planar surface, the free or inboard end of this collar 32 being provided with axial cam surfaces or ramps 33, three such equally, circumferentially spaced apart ramps being used in the embodiment illustrated.

The cam element 22, in the form of an annular ring, has a flat end surface 34 on one end, its inboard or left-hand end, as seen in FIG. 1, for abutment against the bearing retaining washer 17, while the opposite end or outboard end of the cam element is provided with axial cam surfaces or ramps 35, three such cam ramps being shown, for cooperation with the matching ramps or cam surfaces 33 of spindle nut 21, whereby to effect and maintain axial displacement of the cam element 22 relative to the spindle nut 21 in a manner to be described.

The coiled torsion spring 23 is used to normally rotatively bias the cam element 22 in a direction relative to the spindle nut 21 to cause rotational motion of the cam element 22, with respect to the spindle nut 21, in an up-ramp direction to cause maximum axial extension of these elements, with respect to each other, within the limits described hereinafter. The spring 23, which is placed in tension before assembly, is mounted to encircle the collar 32 of spindle nut 21 and a portion of the cam element 22 with one end of the spring engaged in a suitable aperture 36 provided for this purpose in the inboard end of the nut 21, the opposite end of the spring being operatively connected to the cam element 22 as by having this end of the spring engaged in a suitable slot 37 in a separate element, such as the angled annular ring 24 suitably fixed, as by a press fit, to the cam element 22 for rotation therewith, whereby to normally bias the cam element 22 in an up-ramp or clockwise direction, as indicated by the arrow in FIG. 2, with respect to the spindle nut 21.

It can be understood from the foregoing that relative rotation of the cam element 22 with respect to spindle nut 21 in the opposite direction will result in a down-ramp movement, thus shortening the axial extension of these elements. The angle of the ramp or cam surfaces 33 and 35 on these elements is selected so that these elements will frictionally lock against any axial force applied against these elements in a direction which would otherwise shorten their axial extension.

To permit unit handling of the spindle nut 21, cam element 22, torsion spring 23 and angled annular ring 24, and to limit the axial movement between the cam element relative to the spindle nut 21, these elements can be pre-assembled in proper relationship with respect to each other, as shown in FIG. 1, after which suitable means may be provided to retain this relationship. For example, portions of the planar surface 31 of the spindle nut 21 can be upset radially inward to provide a plurality of stops 38, only one being shown in FIG. 1, positioned to engage the radially extending flange portion of the angled annular ring 24, previously fixed to the cam element 22, to limit axial movement of the angled annular ring 24 and therefore cam element 22 in an outward direction relative to nut 21, to the left as seen in FIG. 1, whereby these elements, as just described, are in effect a self-contained, self-adjusting bearing nut assembly 20. Axial movement of the angled annular ring 24, fixed to the cam element 22, is thus limited so as to prevent full rise or up-camming of the cam surfaces on the spindle nut 21 and the cam element 22, with respect to each other, to prevent unwinding of the previously pre-tensioned spring 23.

With this arrangement, the axial extension of the cam element 22 with respect to the nut 21 is limited as defined by the limitations permitted by the stops 38 on the nut 21 engaging the angled annular ring 24. It is to be realized that the stops 38 can be pre-formed in the nut 21 before assembly of the other components therein and that the angled annular ring 24 could be provided with suitable corresponding notches therein, whereby this element could be assembled with its notches in alignment with the stops into the open end of the spindle nut 21 and then rotated relative to nut 21 after assembly to effect locking engagement of the ring 24 relative to the stops on the spindle nut 21. It should also be realized that, if desired, the various elements of the self-adjusting bearing nut assembly can be assembled directly onto the spindle 10.

As best seen in FIG. 1, the bearing nut assembly 20 is assembled to the spindle 10, of the spindle, bearings and hub assembly, by means of the threaded bore portion 27 of spindle nut 21 threaded onto the threaded portion 10c of the spindle until it bottoms on the free end of the spindle, with flange 28 of nut in abutment against the end of the spindle. The design of the wheel assembly and nut assembly is such that before the spindle nut 21 bottoms out on the spindle, the flat end or planar surface 34 of cam element 22 contacts the bearing retaining washer 17 somewhere within the tolerance build-up range of the spindle, bearings and hub assembly, washer 17 having previously been mounted on the spindle with its tab or tang 17a engaged in the keyway 40 of spindle 10. When this occurs, the frictional force between the bearing retaining washer 17 and the cam element 22 stops the latter from turning so that further rotation of the spindle nut 21 causes relative rotation between it and the cam element allowing down-ramp movement and axial shortening of these elements until the spindle nut 21 bottoms against the end of the spindle.

Thus, when threading the nut assembly onto the spindle, the bearing retaining washer 17 first moves into abutment with the inner race of outboard bearing 14 and takes up stack-up tolerances of the bearings, spindle and hub assembly. When these stack-up tolerances have been eliminated, the frictional forces between the cam element 22 and the bearing retaining washer 17 will prevent further rotational movement of the cam element 22, so that further rotation of the spindle nut 21 will cause relative rotation between the spindle nut 21 and the cam element 22 allowing down-ramp movement between these two elements, that is, the ramp surfaces 33 and 35 slip with respect to each other thus decreasing the axial extension across the spindle nut 21 and cam element 22 until the nut 21 bottoms out against the free end of the spindle.

After this, the spindle nut 21 is merely backed off, if necessary, to align one of the keyways 41 therein with the keyway 40 in the spindle so that a key 42 can be inserted to thereby fix the spindle nut 21 against further rotation of the spindle 10. In the embodiment shown, the spindle nut 21 is provided with two keyways 41, diametrically opposite each other. Thus, in the embodiment disclosed, with only two keyways 41 in the spindle nut 21, proper adjustment can be made under any condition because the axial adjustment range of the spindle nut-cam element arrangement is greater than the tolerance stack-up on the spindle plus the movement required when the spindle nut 21 is backed off a maximum of half a turn to line up the keyway.

The key 42 is retained by a wire clip 43 inserted through a hole 44 in the key 42 and through a suitable hole 45 in the spindle aligned with the keyway 40 of the spindle. The cutouts forming the sockets 30 allow insertion of the key and provide access to the key for installation of the clip 43. As best seen in FIGS. 1 and 2, the clip 43 is substantially U-shaped with one leg of the clip being adapted for insertion through the holes in the key and spindle while the other leg terminates in a right angled tang 43a adapted to engage over the outer peripheral surface of the spindle, as seen in FIG. 1, to effectively lock the clip to the spindle.

The ramp angles of cams 33 and 35, previously described, produce sufficient friction to prevent axial thrust from the inner race of bearing 14 to produce down-ramp slippage and a further decrease in the axial length across the nut 21 and cam element 22. Thus, in application, it is only necessary to apply the nut assembly 20 to the spindle 10, draw the spindle nut 21 up onto the spindle until it bottoms out and then back it off to align the keyways for insertion of the key 42 and then spring clip 43. No other adjustment is necessary since the torsion spring 23 will effect any up-ramp movement of the cam element 22 relative to the spindle nut 21 to effect axial lengthening of these elements relative to each other for maintaining proper adjustment of the bearings. Preferably, a suitable lubricant is then applied to the exterior of spindle nut 21 and in bore 16c of hub 16 after which the hub end closure cover 46 is secured in a suitable manner, as desired, to the hub 16 to complete the assembly.

As previously described, the portion 25 of the spindle nut 21 is circular and is made of a diameter to operate in very close clearance with the elongated bore 16c of the hub 16 whereby this spindle nut, fixed to the spindle 10 by key 42, can act as a secondary bearing to rotatably support the hub 16, if necessary. For this reason, it can be described as a bearing nut.

Although bore 16c in the hub 16 is shown in the embodiment illustrated to be of uniform size to receive both the outer race of outboard bearing 14 and the spindle nut 21, it is to be realized that this bore could be a stepped bore so long as the outer diameter of the spindle nut is of a corresponding size to the bore diameter at the outboard end of the hub whereby this spindle nut can act, if necessary, as a bearing or bearing nut to provide a good journal for rotation of the hub 16. Preferably, the materials for the hub 16 and the spindle nut 21 should be selected so as to be of sufficient strength for the loads encountered in a particular application and so as to be compatable with each other to reduce frictional engagement therebetween to a suitable operational limit.

It will be apparent from the above description of the spindle nut 21 that this nut will act as a secondary or temporary bearing, if necessary, since the hub 16 is of an axial length to provide an internal diameter bearing area on the hub that can be rotatably supported by the outer bearing surface of the cylindrical portion 25 of spindle nut 21. In addition, with the arrangement shown, the bearing retaining washer 17 cannot bend or cone over to permit the hub 16 to pass over it since the spindle nut is of a suitable diameter and of sufficient axial length for strength to limit outboard axial movement of the hub 16 and also, of course, bearing 14.

It will be apparent to those skilled in the art that a rotary mechanism in accordance with the subject invention can take many forms with different terminology used to describe, for example, the elements such as hub 16 or spindle 10. For example, the element described as a hub 16 could be the outer housing of a bearing assembly supporting a rotatable shaft in lieu of the element described as the non-rotatable spindle 10.

What is claimed is:

1. A rotary mechanism including a spindle threaded at its outboard end, an inboard bearing means and an outboard bearing means mounted on said spindle, a hub supported on said spindle by said bearing means for rotation relative to said spindle, a thrust retaining washer keyed to and slidably positioned on said spindle for abutment against said outboard bearing means, a self-adjusting nut assembly positioned on said spindle in abutment against said washer outboard thereof for adjusting the axial position of said outboard bearing on said spindle, said self-adjusting nut assembly comprising a cam element in the form of a collar slidably and rotatably mountable on said spindle with axial extending cam surfaces on one side thereof, a bearing nut threadingly engaged on said spindle outboard of said cam element, said bearing nut having axial extending cam surfaces adapted to cooperate with said cam surfaces on said cam element, spring means encircling a part of said cam element and a part of said bearing nut with one end of said spring operatively engaging said cam element and the opposite end of said spring engaging said bearing nut to normally rotatively bias said cam element relative to said bearing nut in an up-cam-ramp direction, key means operatively interconnecting said spindle and said bearing nut to prevent rotational movement of said bearing nut relative to said spindle, said bearing nut being in the form of a body of revolution about an axis of a predetermined diameter to provide an annular outer bearing surface, said hub being of an axial length with a bore on its outboard end to receive said bearing nut with the outboard end of said hub encircling said bearing nut whereby said hub can be rotatably supported by said bearing nut.

2. A rotary mechanism according to claim 1 wherein said bearing nut of said self-adjusting nut assembly is provided with a radially inward extending annular flange at its outboard end adapted to abut against the outboard threaded end of said spindle, and wherein radial extending lock means are secured to said bearing nut, said key means and said spindle to limit axial displacement of said bearing nut and said key means relative to said spindle.

3. A rotary mechanism according to claim 1 further including a closure cover fixed to the outboard end of said hub out of engagement with said spindle and said self-adjusting nut assembly and, wherein said bearing surface of said bearing nut and the bore surface at the outboard end of said hub have a coating of lubricant therein.

4. A rotary mechanism including a spindle threaded at its outboard end, an inboard bearing means and an outboard bearing means mounted in spaced apart relation on said spindle, said inboard bearing means and said outboard bearing means each including an inner race and an outer race, a hub supported on said spindle by said inboard bearing means and said outboard bearing means for rotation relative to said spindle, said hub at its ouboard end having a bore opening to receive said outer race of said outboard bearing means and to receive a secondary bearing outboard of said outboard means, a thrust retaining washer keyed to and slidably positioned on said spindle for abutment against said inner race of said outboard bearing means, a self-adjusting nut assembly mounted on the outboard end of said spindle for maintaining axial adjustment of said bearing means on said spindle, said self-adjusting nut assembly including a cam element, in the form of a collar with a flat face on one side and axial extending cam surfaces on its other side, slidably and rotatably mounted on said spindle with said flat face of said cam element in abutment against said thrust retaining washer, a bearing nut threadingly engaged on said spindle outboard of said cam element, said bearing nut having an axial extending cam surface on its inboard side in abutment against said cam surfaces of said cam element, coiled spring means having one end fixed to said bearing nut and its opposite end operatively connected to said cam element to normally rotatively bias said cam element relative to said bearing nut in an up-cam-ramp direction, and key means axially and non-rotatably fixed to said spindle and operatively connected to said bearing nut to prevent rotation of said bearing nut relative to said spindle, said bearing nut having an outer annular peripheral surface of a diameter and of an axial length positioned in said bore opening of said hub whereby said bearing nut is operable as a secondary bearing to rotatably support and retain said hub on said spindle.

5. A rotary mechanism including a spindle threaded at its outboard end, an inboard bearing and an outboard bearing mounted in spaced apart relation on said spindle, a hub supported on said spindle by said inboard bearing and said outboard bearing for rotation relative to said spindle, said hub at its outboard end having a bore opening to receive said outboard bearing, a thrust retaining washer keyed to and slidably positioned on said spindle for abutment against said outboard bearing, a collar having a flat face on one side thereof and axially extending cam surfaces on the other side thereof slidably and rotatably mounted on said spindle with said flat face of said collar in abutment against said thrust retaining washer, an internal wrenching nut threadingly engaged on said spindle outboard of said collar, said internal wrenching nut being in the form of a body of revolution about an axis and of a predetermined outside diameter for a substantial axial length to provide a bearing surface adapted for cooperation with the bored opening in said hub to rotatably support said hub, said internal wrenching nut as positioned on said spindle having an inner collar portion with axial extending cam surfaces adapted to cooperate with said cam surfaces on said collar and having radially outward from said inner collar portion a radially extending flat surface portion adapted to limit outboard axial movement of said hub relative to said spindle, coiled torsion spring means fixed at one end to said internal wrenching nut and at its opposite end operatively connected to said collar to normally rotatively bias said collar relative to said internal wrenching nut in an up-cam-ramp direction, and key means axially and non-rotatably fixed to said spindle and operatively connected to said internal wrenching nut to prevent rotation of said internal wrenching nut relative to said spindle.

* * * * *

UNITED STATES PATENT AND TRADEMARK OFFICE
CERTIFICATE OF CORRECTION

PATENT NO. : 3,901,568
DATED : August 26, 1975
INVENTOR(S) : Francis O. Gadd et al It is certified that error appears in the above-identified patent and that said Letters Patent are hereby corrected as shown below:

Title page, column 1, under heading of "Inventors:" delete "Francis O. Gadd, Birmingham; Charles N. Hay, Sandusky, both of Ohio; William C. Long, Rochester, Mich." and substitute -- Francis O. Gadd, Birmingham, Mich.; Charles N. Hay, Sandusky, Ohio; William C. Long, Rochester, Mich. --;

Column 7, line 14, after "outboard" (second occurrence), insert -- bearing --.

Signed and Sealed this twenty-seventh Day of January 1976

[SEAL]

Attest:

RUTH C. MASON
Attesting Officer

C. MARSHALL DANN
Commissioner of Patents and Trademarks